US012623550B2

(12) United States Patent
Teymouri et al.

(10) Patent No.: US 12,623,550 B2
(45) Date of Patent: May 12, 2026

(54) DUAL MOTOR TORQUE MONITORING

(71) Applicant: Rivian IP Holdings, LLC, Irvine, CA (US)

(72) Inventors: Armin Teymouri, San Pedro, CA (US); Younes Sangsefidi, Irvine, CA (US); Mehrdad Yazdanian, Irvine, CA (US); Chia-Chou Yeh, Torrance, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 165 days.

(21) Appl. No.: 18/407,641

(22) Filed: Jan. 9, 2024

(65) Prior Publication Data

US 2025/0222776 A1 Jul. 10, 2025

(51) Int. Cl.
 *B60L 3/00* (2019.01)
 *B60L 3/12* (2006.01)

(52) U.S. Cl.
 CPC .............. *B60L 3/0061* (2013.01); *B60L 3/12* (2013.01); *B60L 2240/421* (2013.01); *B60L 2240/423* (2013.01)

(58) Field of Classification Search
 CPC ............ B60L 3/0061; B60L 2240/421; B60L 2240/423; B60L 3/12; B60L 2220/42
 See application file for complete search history.

(56) References Cited

U.S. PATENT DOCUMENTS

2010/0222953 A1* 9/2010 Tang ....................... B60L 15/20
                                                701/22
2024/0391521 A1* 11/2024 Park ....................... B62D 5/003

OTHER PUBLICATIONS

Peng Z, Du C, Zhou A, et al., Motor torque estimation and security control for electric vehicles based on parameters feature extraction, Advances in Mechanical Engineering. 2022, vol. 14(4). https://journals.sagepub.com/home/ade, dated Apr. 3, 2022 (11 pages).
Peng, Zhiyuan et al., Motor torque estimation and security control for electric vehicles based on parameters feature extraction, Advances in Mechanical Engineering, Mar. 3, 2022, vol. 14(4), pp. 1-11. Retrieved on Dec. 17, 2023 from https://www.journals.sagepub.com/home/ade.

* cited by examiner

*Primary Examiner* — Rodney A Butler
(74) *Attorney, Agent, or Firm* — Patterson + Sheridan, LLP

(57) ABSTRACT

Systems and methods for dual motor torque monitoring are provided. One method includes determining torque errors for a first motor, determining torque errors for a second motor, determining combined torque errors for the first motor and the second motor, determining a torque fault based on the torque errors for the first motor, the torque errors for the second motor and the combined torque errors, and executing a predetermined function based on the torque fault. In one example, the predetermined function may include transmitting a torque fault notification message from a motor control unit processor to a vehicle control system processor.

19 Claims, 11 Drawing Sheets

800

810
DETERMINE TORQUE ERRORS FOR FIRST MOTOR

820
DETERMINE TORQUE ERRORS FOR SECOND MOTOR

830
DETERMINE COMBINED TORQUE ERRORS FOR
FIRST MOTOR AND SECOND MOTOR

840
DETERMINE TORQUE FAULT BASED ON TORQUE
ERRORS FOR FIRST MOTOR, TORQUE ERRORS FOR SECOND
MOTOR, AND COMBINED TORQUE ERRORS

850
EXECUTE PREDETERMINED FUNCTION BASED
ON TORQUE FAULT

DUAL MOTOR TORQUE MONITORING

INTRODUCTION

The present disclosure relates to electric vehicles (EVs). More particularly, the present disclosure relates to dual motor torque monitoring for EVs.

SUMMARY

Embodiments of the present disclosure advantageously provide systems and methods for dual motor torque monitoring.

In certain embodiments, a method for dual motor torque monitoring includes determining torque errors for a first motor, determining torque errors for a second motor, determining combined torque errors for the first motor and the second motor, determining a torque fault based on the torque errors for the first motor, the torque errors for the second motor and the combined torque errors, and executing a predetermined function based on the torque fault. In certain embodiments, the predetermined function includes transmitting a torque fault notification message from a motor control unit processor to a vehicle control system processor.

DETAILED DESCRIPTION

Figure 1:
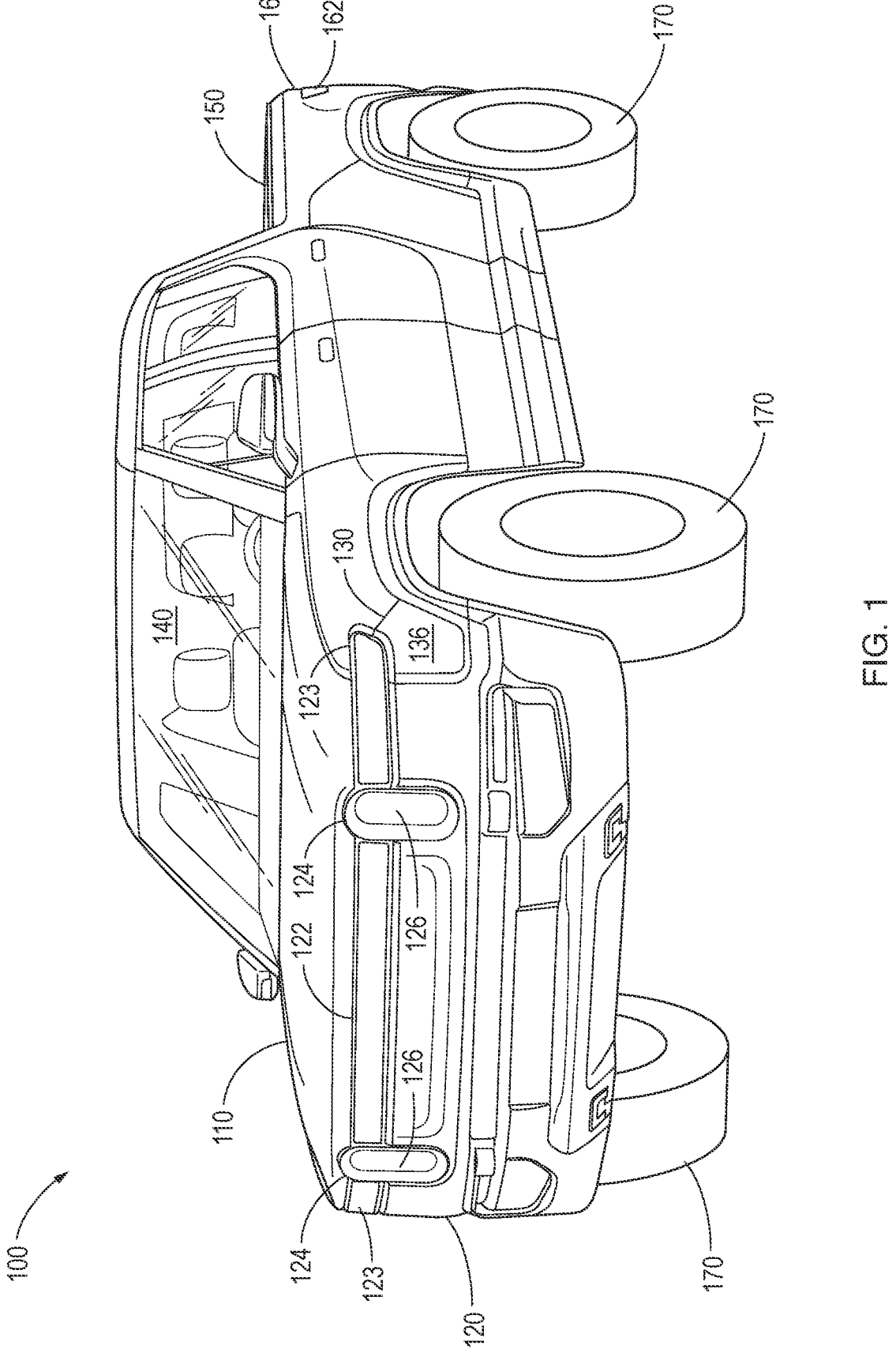
FIG. 1 depicts a diagram of an example electric vehicle, in accordance with embodiments of the present disclosure.

Generally, electric vehicles (EVs) may be classified into different categories based on the architecture of the propulsion system. All-electric vehicles (AEVs), also known as full-electric vehicles (FEVs) or battery electric vehicles (BEVs), are propelled by AC motors that are connected to gearboxes that drive the wheels. The AC motors are powered by a DC battery pack that must be periodically recharged at a charging station. Hybrid electric vehicles (HEVs) and plug-in hybrid electric vehicles (PHEVs) are also propelled by AC motors that are powered by a DC battery pack, but additionally incorporate an internal combustion engine that drives a generator to recharge the DC battery pack. Some HEVs and PHEVs may also connect the internal combustion engine to a common gearbox or transmission to drive the wheels.

An electric drive unit (EDU) combines an AC motor, a gearbox, and a motor control unit (MCU) into a single mechanical package. The MCU includes, inter alia, a processor, a controller, etc., and an inverter that converts DC power provided by the battery pack to AC power provided to the AC motor. The inverter controls the speed and torque of the AC motor by adjusting the AC motor voltage frequency (proportional to speed) and the AC motor current (proportional to torque). Many EVs use Permanent-Magnet Synchronous Motors (PMSMs), which are powered by continuous sinusoidal AC current and use permanent magnets in the rotor (whose N-S axes may be axially aligned with the output shaft) and electromagnets in the stator. Other EVs use asynchronous AC induction motors, which use electromagnets in the both the rotor and the stator. Synchronous reluctance motors (SynRM) and internal permanent-magnet IPM SynRMs may also be used.

A single-motor EV provides either front-wheel drive or rear-wheel drive, and has a front EDU connected to the front wheels or a rear EDU connected to the rear wheels, respectively. The EDU has a single AC motor, a single gearbox connected to a limited-slip differential, and a single MCU. The differential is connected to each front wheel or each rear wheel.

A dual-motor EV provides all-wheel drive, and has a front EDU connected to the front wheels and a rear EDU connected to the rear wheels. Each EDU has a single AC motor, a single gearbox connected to a limited-slip differential, and a single MCU. The front EDU differential is connected to each front wheel, and the rear EDU differential is connected to each rear wheel.

A quad-motor EV also provides all-wheel drive, and has a front dual motor EDU connected to the front wheels (front axle), and a rear dual motor EDU connected to the rear wheels (rear axle). In other words, a quad-motor EV has two motors per axle. Each dual motor EDU has two AC motors, two gearboxes, and two MCUs or a single MCU with two processors, two inverters, etc. Each AC motor is connected to a gearbox, and each gearbox is connected to one wheel.

In a dual motor EDU, each processor independently controls the speed and torque of one motor based on commands received from the EV control system.

Accordingly, because each processor: (i) must independently determine whether the estimated motor torque complies with an axle torque limit, (ii) has no visibility over the other processor or the torque produced by the other motor, and (iii) must assume a worst-case scenario with respect to the torque being produced by the other motor, the axle torque limit is divided in half to generate a motor torque limit for each motor. Unfortunately, the reduction of the axle torque limit by 50% may generate false alarms (false torque faults), i.e., conditions in which the axle torque limit is actually not exceeded because the combination of estimated motor torque from both motors is less than the axle torque limit.

For example, if the estimated motor torque from one motor was 10% above the motor torque limit and the estimated motor torque from the other motor was 50% below the motor torque limit, then a false alarm would be generated even though the estimated motor torque from both motors is 20% below the axle torque limit.

Embodiments of the present disclosure advantageously provide a system and method for dual motor torque monitoring that provides a high level of motor torque integrity at higher speeds (such as 2,000 rpm and above) as well as lower speeds (such as 1,000 rpm). Embodiments described herein further provide visibility and control over both processors and the torque produced by the both motors for recovery and other purposes, and set the motor torque limit for each motor to the axle torque limit, which significantly decreases the probability of false alarms (false torque faults). Accordingly, embodiments of the present disclosure advantageously provide, inter alia, broader operation coverage, and enhanced redundancy, etc.

FIG. 1 depicts a diagram of electric vehicle 100, in accordance with embodiments of the present disclosure.

Electric vehicle 100 includes, inter alia, a frame and body 110, an electrical power storage and distribution system, a propulsion system, a suspension system, a steering system, auxiliary and accessory systems (such as thermal management, lighting, wireless communications, navigation, etc.), etc.

Generally, body 110 may be directly or indirectly mounted to a frame (i.e., body-on-frame construction), or body 110 may be formed integrally with a frame (i.e., unibody construction). Body 110 includes, inter alia, front end 120, front light bar 122, front turn lights 123, stadium light ring 124, headlights 126, charging port 130 with charging port cover 136 concealing charging connector socket, driver/passenger compartment or cabin 140, bed 150, rear end 160 with rear tail lights 162, a rear light bar, etc. Electric vehicle 100 may be a pickup truck, a sport utility vehicle (SUV) in which bed 150 is replaced by an extension of cabin 140, or a sedan in which bed 150 is replaced by a trunk. In certain embodiments, electric vehicle may be an electric delivery vehicle, an electric cargo van, etc.

The propulsion system may include, inter alia, one or more ECUs, one or more EDUs, wheels 170, etc. The electrical power storage and distribution system may include, inter alia, one or more ECUs, a battery pack including one or more battery modules, a vehicle charging subsystem including charging port 130, high voltage (HV) cables, etc.

Figure 2:
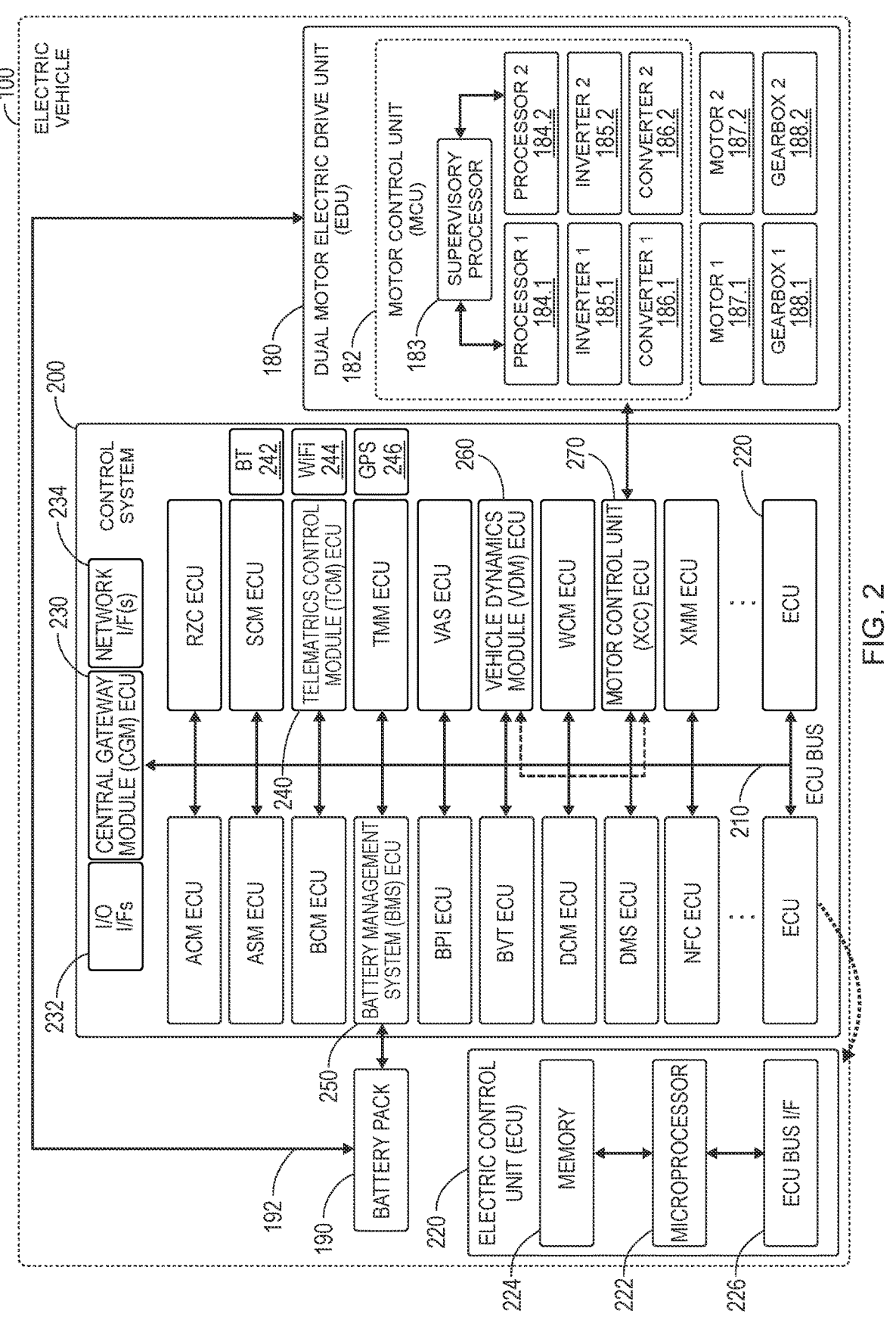
FIG. 2 presents a block diagram of example components of an EV, in accordance with embodiments of the present disclosure.

FIG. 2 presents a block diagram of example components of electric vehicle 100, in accordance with embodiments of the present disclosure.

Generally, electric vehicle 100 includes control system 200 that is configured to perform the functions necessary to operate electric vehicle 100. In certain embodiments, control system 200 includes a number of ECUs 220 coupled to ECU bus 210 (also known as a controller area network or CAN). Each ECU 220 performs a particular set of functions, and includes, inter alia, microprocessor 222 coupled to memory 224 and ECU bus interface (I/F) 226.

Microprocessor 222 may be a microcontroller unit, a microprocessing unit, a central processing unit (CPU), a programmable logic device (PLD), a complex PLD, a field programmable gate array (FPGA), an application specific integrated circuit (ASIC), etc. Memory 224 may include non-volatile and/or volatile memory, such as read only memory (ROM), random access memory (RAM), static RAM (SRAM), dynamic RAM (DRAM), flash memory, etc.

In certain embodiments, control system 200 may include a number of system-on-chips (SoCs). Each SoC may include a number of multi-core processors coupled to a high-speed interconnect and on-chip memory that provide more robust functionality and performance than a single ECU 220. Accordingly, each SoC may combine the functionality provided by several ECUs 220.

Control system 200 may be coupled to sensors (such as cameras, radar sensors, ultrasonic sensors, etc.), actuators (such as electric, hydraulic, pneumatic, etc.), input/output (I/O) devices, as well as other components within the propulsion system, the electrical power storage and distribution system, the suspension system, the steering system, the auxiliary and accessory systems, etc., such as dual motor EDU 180, battery pack 190, etc.

Control system 200 may include central gateway module (CGM) ECU 230, which provides a central communications hub for electric vehicle 100. CGM ECU 230 includes (or is coupled to) I/O interfaces (I/Fs) 232 to receive data from, and send commands to, various vehicle components, such as sensors, actuators, input devices, output devices, etc. CGM ECU 230 also includes (or is coupled to) network interfaces (I/Fs) 234 to provide network connectivity through ECU bus ports, local interconnect network (LIN) ports, Ethernet ports, etc.

CGM ECU 230 may route messages (including commands, data, etc.) over ECU bus 210 from one ECU 220 to another ECU 220, or from one ECU 220 to multiple ECUs 220 (such as broadcast messages, etc.). In one example, CGM ECU 230 may receive a message from a source ECU 220, process the message to determine, inter alia, the destination ECU 220, and then transmit the message to the destination ECU 220. In another example, CGM ECU 230 may simply arbitrate ECU bus 210 to allow the source ECU 220 to send a message directly to the destination ECU 220. For example, VDM ECU 260 may send a message to motor control unit (XCC) ECU 270 that includes the torque commands for dual motor EDU 180, etc.

CGM ECU 230 may receive data from a sensor, an I/O device, a vehicle component, etc., and then send a message containing the data to the appropriate ECU 220 over ECU bus 210. Similarly, CGM ECU 230 may receive a message containing a command or data from a source ECU 220, and then send the command or the data to the appropriate actuator, I/O device, vehicle component, etc. Additionally, CGM ECU 230 may manage the vehicle mode (such as road driving mode, off-roading mode, tow mode, camping mode, parked mode, etc.), and may control certain vehicle components related to transitioning from one vehicle mode to another vehicle mode.

Control system 200 may include telematics control module (TCM) ECU 240 which provides a wireless communications hub for electric vehicle 100. TCM ECU 240 may include (or may be coupled to) Bluetooth (or Bluetooth Low Energy) transceiver 242, WiFi transceiver 244, GPS receiver 246, etc.

Control system 200 may include battery management system (BMS) ECU 250 to manage the charging of battery pack 190, as well as to perform other related tasks.

In certain embodiments, one or more ECUs 220 may include the necessary interfaces to be coupled directly to particular sensors, actuators, I/O devices, and other vehicle system components. For example, BMS ECU 250 may be coupled directly to battery pack 190, motor control unit (XCC) ECU 270 may be coupled directly to one or more EDUs 180, etc. Additionally, components may also be coupled directly to one another. For example, battery pack 190 may be directly coupled to one or more EDUs 180, etc.

In certain embodiments, dual motor EDU 180 may include, inter alia, MCU 182 that controls a dual motor drive unit configuration including motor 187.1 coupled to gearbox 188.1 (which is coupled to one wheel 170), and motor 187.2 coupled to gearbox 188.2 (which is coupled to one wheel 170). MCU 182 may include, inter alia, supervisory processor 183, processor 184.1, processor 184.2, non-volatile and/or volatile memory (such as ROM, RAM, SRAM, DRAM, flash memory, etc.), a communications interface for XCC ECU 270, etc. Supervisory processor 183, processor 184.1, and processor 184.2 may be microcontroller units, microprocessing units, CPUs, PLDs, CPLDs, FPGAs, ASICs, etc.

At least a portion of the memory may be accessible to supervisory processor 183, processor 184.1, and processor 184.2 as global RAM, in which variables with global scope may be stored, as well as other data. In certain embodiments, supervisory processor 183, processor 184.1, and processor 184.2 may read from and write to all of the global RAM. In other embodiments, supervisory processor 183 and processor 184.1 may read from and write to a first section of global RAM, while supervisory processor 183 and processor 184.2 may read from and write to a second (different) section of global RAM.

In certain embodiments, supervisory processor 183 and processors 184.1, 184.2 may be multiple integrated circuit devices working in cooperation to accomplish the requisite functionality. In other embodiments, supervisory processor 183 and processors 184.1, 184.2 may be configured as multiple processors within a single integrated device, such as a SoC, etc. In other embodiments, supervisory processor 183 and processors 184.1, 184.2 may be configured as a single processor with multiple processing cores (i.e., a multi-core processor), with each processing core providing respective functionality.

Processor 184.1 is coupled to inverter 185.1, converter 186.1, and motor 187.1, and processor 184.2 is coupled to inverter 185.2, converter 186.2, and motor 187.2. Inverter 185.1 and converter 186.1 are coupled to motor 187.1 and battery pack 190, while inverter 185.2 and converter 186.2 are coupled to motor 187.2 and battery pack 190. In certain embodiments, the functionality provided by inverter 185.1 and converter 186.1 may be combined into a single component, such as inverter 185.1. Similarly, the functionality provided by inverter 185.2 and converter 186.2 may be combined into a single component, such as inverter 185.2.

Supervisory processor 183 generally monitors and controls the operation of processors 184.1, 184.2, and provides commands, parameters, and data to, and receives data from, processors 184.1, 184.2 as well as XCC EDU 270. More particularly, supervisory processor 183 may be configured to perform dual motor torque monitoring for motors 187.1, 187.2. Processor 184.1 generally controls the operation of inverter 185.1, converter 186.1, and motor 187.1, and receives commands, parameters, and data from, and provides data to, supervisory processor 183. Similarly, processor 184.2 generally controls the operation of inverter 185.2, converter 186.2, and motor 187.2, and receives commands, parameters, and data from, and provides data to, supervisory processor 183 for transmission to XCC ECU 270.

XCC ECU 270 may be coupled directly to supervisory processor 183 via a communication signal cable, BMS ECU 250 may be coupled directly to battery pack 190 via a communication signal cable, and battery pack 190 may be coupled directly to inverter 185 and converter 186 via one or more HV cables 192.

In certain embodiments, control system 200 may also include, inter alia, autonomy control module (ACM) ECU, autonomous safety module (ASM) ECU, body control module (BCM) ECU, battery power isolation (BPI) ECU, balancing voltage temperature (BVT) ECU, door control module (DCM) ECU, driver monitoring system (DMS) ECU, near-field communication (NFC) ECU, rear zone control (RZC) ECU, seat control module (SCM) ECU, thermal management module (TMM) ECU, vehicle access system (VAS) ECU, winch control module (WCM) ECU, experience management module (XMM) ECU, etc.

Figure 3:
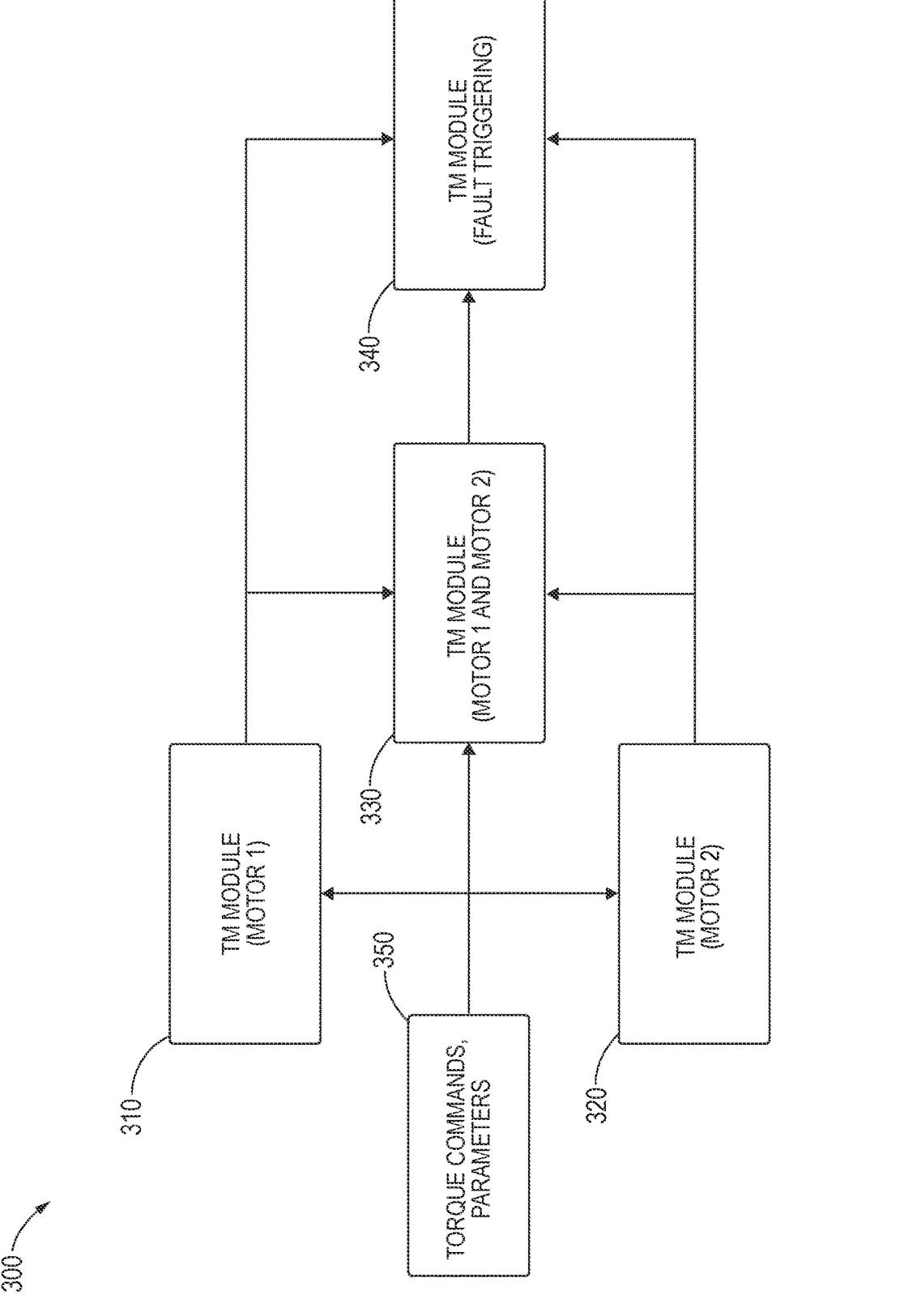
FIG. 3 presents a block diagram illustrating an exemplary dual motor torque monitoring software architecture, in accordance with embodiments of the present disclosure.

FIG. 3 presents a block diagram illustrating dual motor torque monitoring processing architecture 300, in accordance with embodiments of the present disclosure.

Generally, the functionality associated with dual motor torque monitoring may be apportioned to one or more processing modules, such as software modules that are executed by supervisory processor 183. In certain embodiments, the processing modules may include one or more PLDs, complex PLDs, FPGAs, ASICs, custom circuitry, etc., that cooperate with software modules executed by supervisory processor 183 to perform dual motor torque monitoring.

In certain embodiments, dual motor torque monitoring processing architecture 300 may include, inter alia, TM module 310 for motor 1 (motor 187.1), TM module 320 for motor 2 (motor 187.2), TM module 330 for motor 1 and motor 2 (motor 187.1 and motor 187.2), and TM module 340 for fault triggering. Data 350 may include, inter alia, torque commands and parameters, such as model torque estimates for motors 1 and 2, loss torque estimates for motors 1 and 2, torque commands for motors 1 and 2, speeds for motors 1 and 2, minimum speed limits for motors 1 and 2, etc. Data 350 may be provided to TM module 310, TM module 320, and TM module 330 at a certain update rate, such as 1 Hz, 2 Hz, etc. Generally, data 350 may be provided by supervisory processor 183, processor 184.1, processor 184.2, control system 200 (such as XCC ECU 270, etc.), etc.

Supervisory processor 183 may be configured to periodically perform dual motor torque monitoring for motors 187.1, 187.2, such as every 1 second (1 Hz), every 0.5 seconds (2 Hz), every 0.2 seconds (5 Hz), every 0.1 seconds (10 Hz), etc. Data 350 may be provided to supervisory processor 183 at the same rate (1 Hz, 2 Hz, etc.) in order to support dual motor torque monitoring for motors 187.1, 187.2.

Generally, TM module 310, TM module 320, TM module 330, and TM module 340 may be provided as separate processing modules (such as separate software modules), as subprocesses within a single processing module (such as subroutines within a single software module), etc. Other processing architectures are also supported.

Figure 4A:
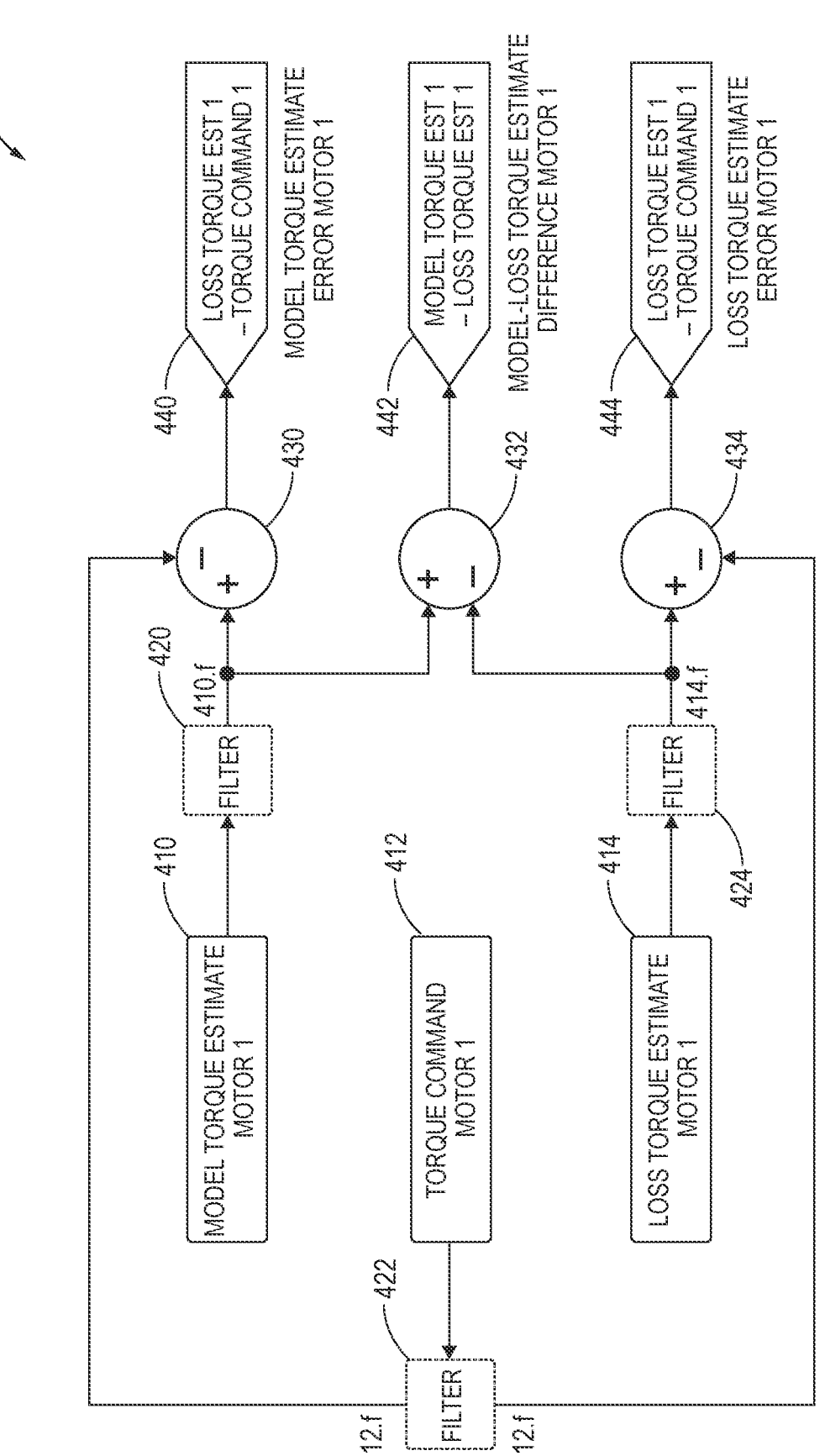
FIGS. 4A, 4B present block diagrams illustrating exemplary functionality for a torque monitor (TM) module for motor 1, in accordance with embodiments of the present disclosure.
Figure 4B:
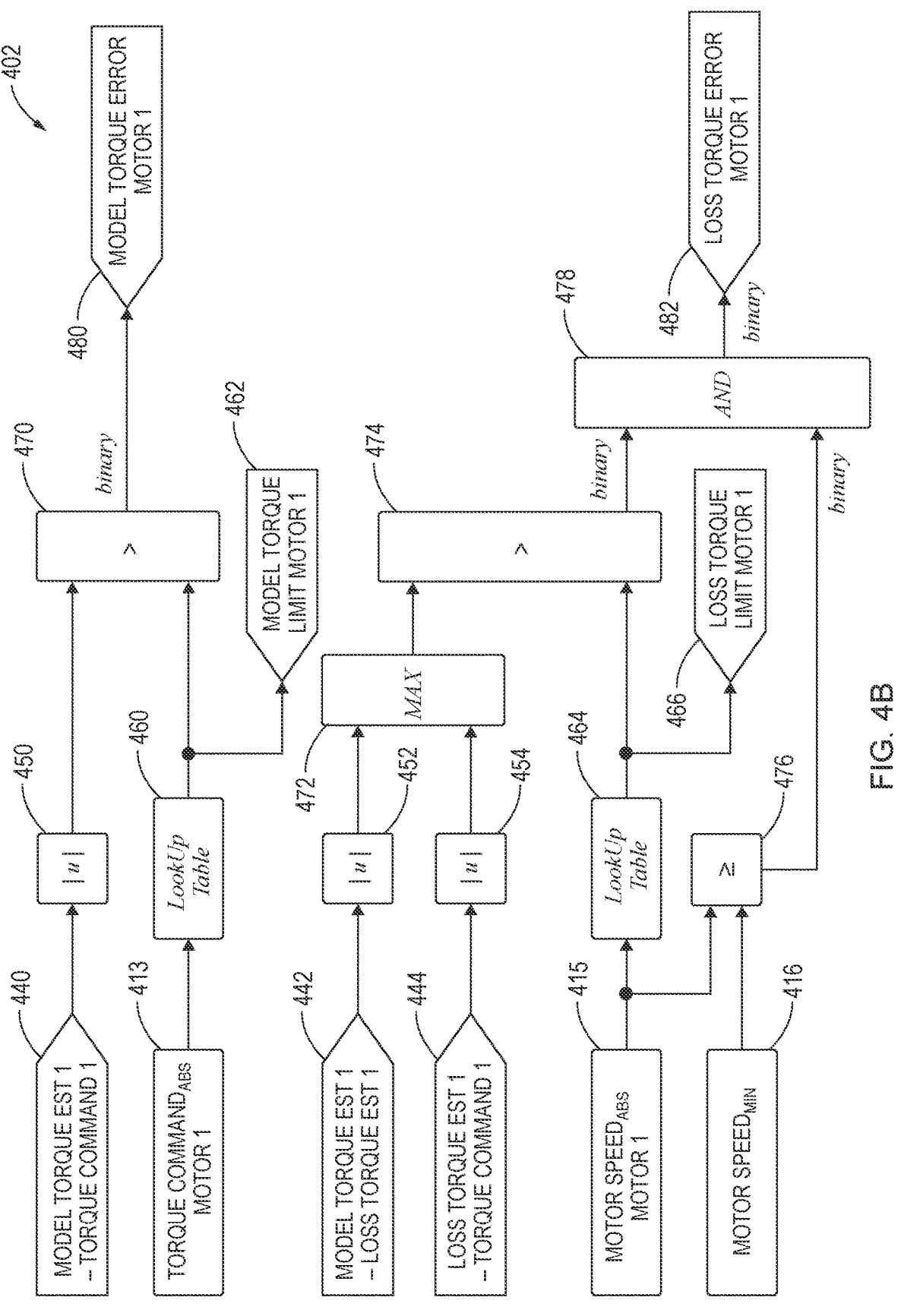

FIGS. 4A, 4B present block diagrams 400, 402, respectively, illustrating exemplary functionality for TM module 310 for motor 1, in accordance with embodiments of the present disclosure.

Generally, TM module 310 generates a model-based torque error for motor 1 and a loss-based torque error for motor 1 by comparing the model-based torque estimate for motor 1, the torque command for motor 1, and the loss-based torque estimate for motor 1.

More particularly, FIG. 4A presents a first portion of the functionality for TM module 310, while FIG. 4B presents a second portion of the functionality for TM module 310. The first portion of the functionality for TM module 310 generates several intermediate results for input to the second portion of the functionality for TM module 310.

As depicted in FIG. 4A, TM module 310 receives certain data from data 350, including, inter alia, model torque estimate 410 for motor 1, torque command 412 for motor 1, and loss torque estimate 414 for motor 1. TM module 310 processes these data, and outputs certain results to the second portion of the functionality for TM module 310, including model torque estimate error 440 for motor 1, model-loss torque estimate difference 442 for motor 1, and loss torque estimate error 444 for motor 1.

In certain embodiments, subtraction block 430 may receive model torque estimate 410 and torque command 412 from data 350, subtraction block 432 may receive model torque estimate 410 and loss torque estimate 414 from data 350, and subtraction block 434 may receive loss torque estimate 414 and torque command 412 from data 350.

Subtraction block 430 receives model torque estimate 410 and torque command 412, subtracts torque command 412 from model torque estimate 410, and outputs model torque estimate error 440 for motor 1. Subtraction block 432 receives model torque estimate 410 and loss torque estimate 414, subtracts loss torque estimate 414 from model torque estimate 410, and outputs model-loss torque estimate difference 442 for motor 1. Subtraction block 434 receives loss torque estimate 414 and torque command 412, subtracts torque command 412 from loss torque estimate 414, and outputs loss torque estimate error 444 for motor 1.

In other embodiments, respective digital filters may be applied to model torque estimate 410, torque command 412, and loss torque estimate 414 as new data 350 arrive over time. For example, digital filter 420 may receive model torque estimate 410 and output filtered model torque estimate 410.f, digital filter 422 may receive torque command 412 and output filtered torque command 412.f, and digital filter 424 may receive loss torque estimate 414 and output filtered loss torque estimate 414.f. Digital filters 420, 422, 424 may be $1^{st}$ order digital filters, $2^{nd}$ order digital filters, etc.

Subtraction block 430 receives filtered model torque estimate 410.f and filtered torque command 412.f, subtracts filtered torque command 412.f from filtered model torque estimate 410.f, and outputs model torque estimate error 440 for motor 1. Subtraction block 432 receives filtered model torque estimate 410.f and filtered loss torque estimate 414.f, subtracts filtered loss torque estimate 414.f from filtered model torque estimate 410.f, and outputs model-loss torque estimate difference 442 for motor 1. Subtraction block 434 receives filtered loss torque estimate 414.f and filtered torque command 412.f, subtracts filtered torque command 412.f from filtered loss torque estimate 414.f, and outputs loss torque estimate error 444 for motor 1.

As depicted in FIG. 4B, TM module 310 also receives torque command$_{ABS}$ 413 for motor 1, motor speed$_{ABS}$ 415 for motor 1, and motor speed$_{MIN}$ 416 for motor 1 from data 350. TM module 310 processes the data received from data 350 as well as model torque estimate error 440, model-loss torque estimate difference 442, loss torque estimate error 444 (described above), and outputs certain results to TM module 330, including model torque error 480 for motor 1, and loss torque error 482 for motor 1.

TM module 310 generates model torque error 480 based on model torque estimate error 440 (which is based on torque command 412 and model torque estimate 410) and model torque limit 462 for motor 1.

Advantageously, model torque limit 462 for motor 1 is equal to the axle torque limit, which is twice the torque limit of each motor in the conventional method discussed above. This expands motor torque integrity all the way to half the speed of the conventional method, such as from 2,000 rpm (conventional method) to 1,000 rpm (certain embodiments of the present disclosure). Additionally, the use of the axle torque limit for motor 1 may significantly reduce the probability of false torque triggering for model-based torque limits.

More particularly, model torque estimate error 440 is input to absolute value block 450, which generates and provides the absolute value of model torque estimate error 440 to greater than (>) block 470. Torque command$_{ABS}$ 413 is input to lookup table function 460, which generates and provides model torque limit 462 to greater than block 470. Greater than block 470 compares the absolute value of model torque estimate error 440 to model torque limit 462, and generates model torque error 480 (a binary value). When the absolute value of model torque estimate error 440 is greater than model torque limit 462, model torque error 480 has a value of 1 (or TRUE), otherwise, model torque error 480 has a value of 0 (or FALSE).

TM module 310 generates loss torque error 482 based on loss torque estimate error 444 (which is based on torque command 412 and loss torque estimate 414), model-loss torque estimate difference 442 (which is based on model torque estimate 410 and loss torque estimate 414), and loss torque limit 466 for motor 1.

Advantageously, loss torque limit 466 for motor 1 is also equal to the axle torque limit, which is twice the torque limit of each motor in the conventional method discussed above. This expands motor torque integrity all the way to half of the speed of the conventional method, such as from 2,000 rpm (conventional method) to 1,000 rpm (certain embodiments of the present disclosure). Additionally, the use of the axle torque limit for motor 1 may significantly reduce the probability of false torque triggering for loss-based torque limits.

More particularly, model-loss torque estimate difference 442 is input to absolute value block 452, which generates and provides the absolute value of model-loss torque estimate difference 442 to MAX block 472. Loss torque estimate error 444 is also input to absolute value block 452, which generates and provides the absolute value of loss torque estimate error 444 to MAX block 472. MAX block 472 determines and provides the maximum of these two values to greater than (>) block 474.

Motor speed$_{ABS}$ 415 is input to lookup table function 464, which generates and provides loss torque limit 466 to greater than (>) block 474. Motor speed$_{ABS}$ 415 is also input to greater than or equal to (≥) block 476, along with motor speed$_{MIN}$ 416. Greater than or equal to block 476 compares loss torque limit 466 to motor speed$_{MIN}$ 416, and generates a minimum motor speed binary value. When the motor speed$_{ABS}$ 415 is greater than or equal to motor speed$_{MIN}$ 416, the minimum motor speed binary value has a value of 1 (or TRUE), otherwise, the minimum motor speed binary value has a value of 0 (or FALSE). The minimum motor speed binary value is input to AND block 478.

Greater than (>) block 474 compares the maximum value generated by MAX block 472 to loss torque limit 466, and generates an intermediate loss torque error binary value. When the maximum value generated by MAX block 472 is greater than loss torque limit 466, the intermediate loss torque error binary value has a value of 1 (or TRUE), otherwise, the intermediate loss torque error binary value has a value of 0 (or FALSE). The intermediate loss torque error binary value is input to AND block 478.

As discussed above, the accuracy of loss torque estimate 414 depends on motor speed$_{ABS}$ 415, and improves at higher motor speeds. Accordingly, loss-based torque is deactivated below certain motor speeds (i.e., motor speed$_{MIN}$ 416, such as 1,000 rpm).

The AND block 478 generates loss torque error 482 (a binary value). When both the minimum speed binary value and the intermediate loss torque error binary value are 1 (or TRUE), loss torque error 482 has a value of 1 (or TRUE). Otherwise, loss torque error 482 has a value of 0 (or FALSE).

Model torque error 480 and loss torque error 482 are provided to TM module 330.

In certain embodiments, model torque error 480 may be deactivated during a high voltage (HV) bus active discharge event to avoid interfering with other vehicle crash logic. In certain embodiments, data 350 may include an active short flag for motor 1 (a binary value), which may be set to 1 to signify an HV bus active discharge event, and set to 0 to signify the absence of an HV bus active discharge event. The active short flag for motor 1 may be input to a NOT block (logical compliment), and the output of the NOT block may be input to an AND block along with the output of the greater than block 470. Model torque error 480 is the result of the AND operation of the (negated) active short flag for motor 1 and the output of greater than block 470.

For example, when the active short flag for motor 1 has a value of 0 (signifying the absence of an HV bus active discharge event), the NOT block changes the binary value of the active short flag for motor 1 from 0 to 1, and the AND block performs a logical AND operation on 1 and the output of greater than block 470. The output of the AND block is simply the output of greater than block 470, which is provided as the value of model torque error 480.

Conversely, when the active short flag for motor 1 has a value of 1 (signifying an HV bus active discharge event), the NOT block changes the binary value of the active short flag for motor 1 from 1 to 0, and the AND block performs a logical AND operation on 0 and the output of greater than block 470. The output of the AND block is 0 regardless of the binary value of the output of greater than block 470, which is provided as the value of model torque error 480. A binary value of 0 effectively deactivates model torque error 480.

In certain embodiments, loss torque error 482 may be deactivated during a power down event to avoid interfering with other vehicle logic. In certain embodiments, data 350 may include a power down flag for motor 1 (a binary value), which may be set to 1 to signify a power down event, and set to 0 to signify the absence of a power down event. The power down flag for motor 1 may be input to a NOT block (logical compliment), and the output of the NOT block may be input to an AND block along with the output of the greater than block 474. Loss torque error 482 is the result of the AND operation of the (negated) power down flag for motor 1 and the output of greater than block 474.

Figure 5A:
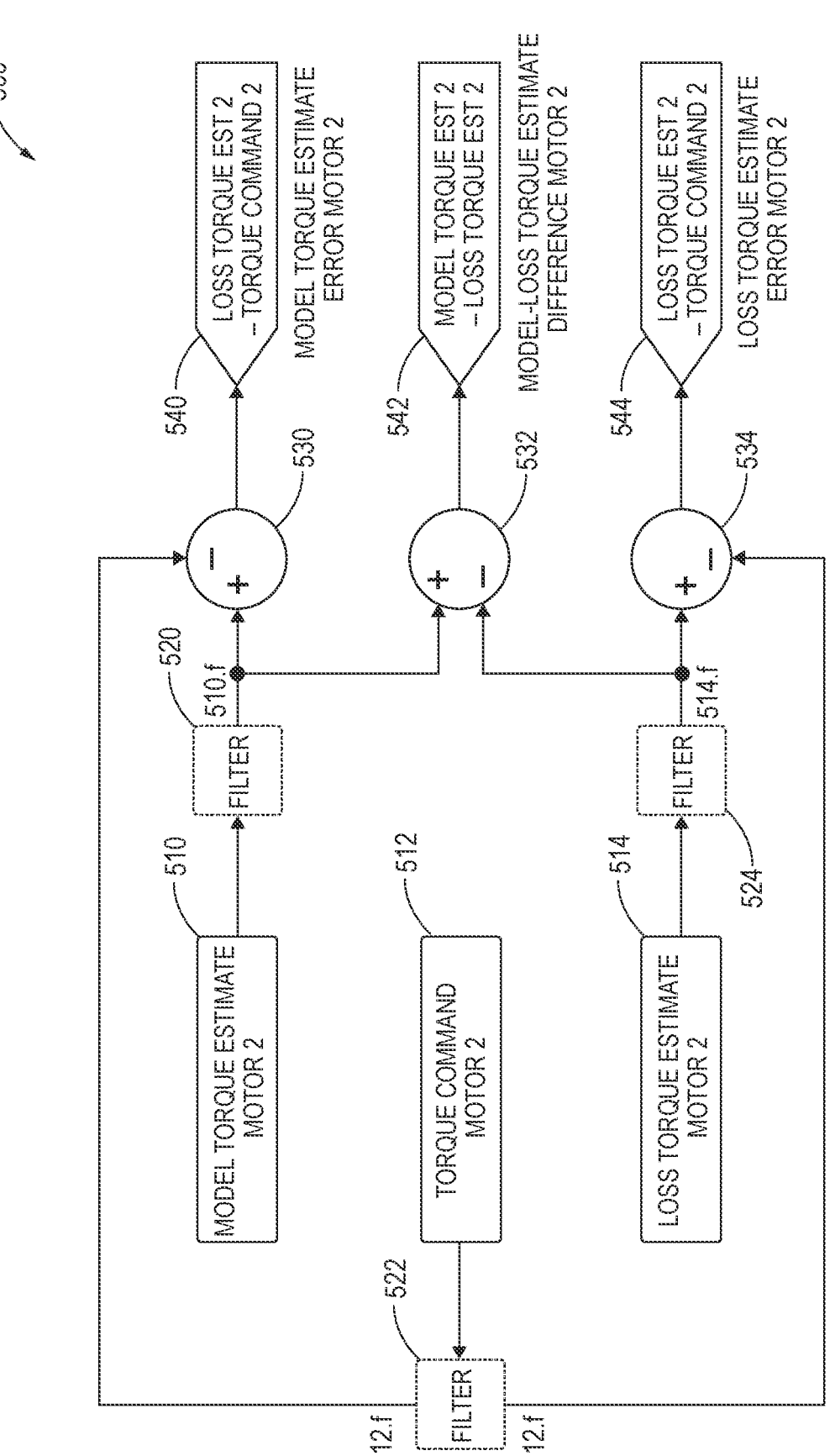
FIGS. 5A, 5B present block diagrams illustrating exemplary functionality for a TM module for motor 2, in accordance with embodiments of the present disclosure.
Figure 5B:
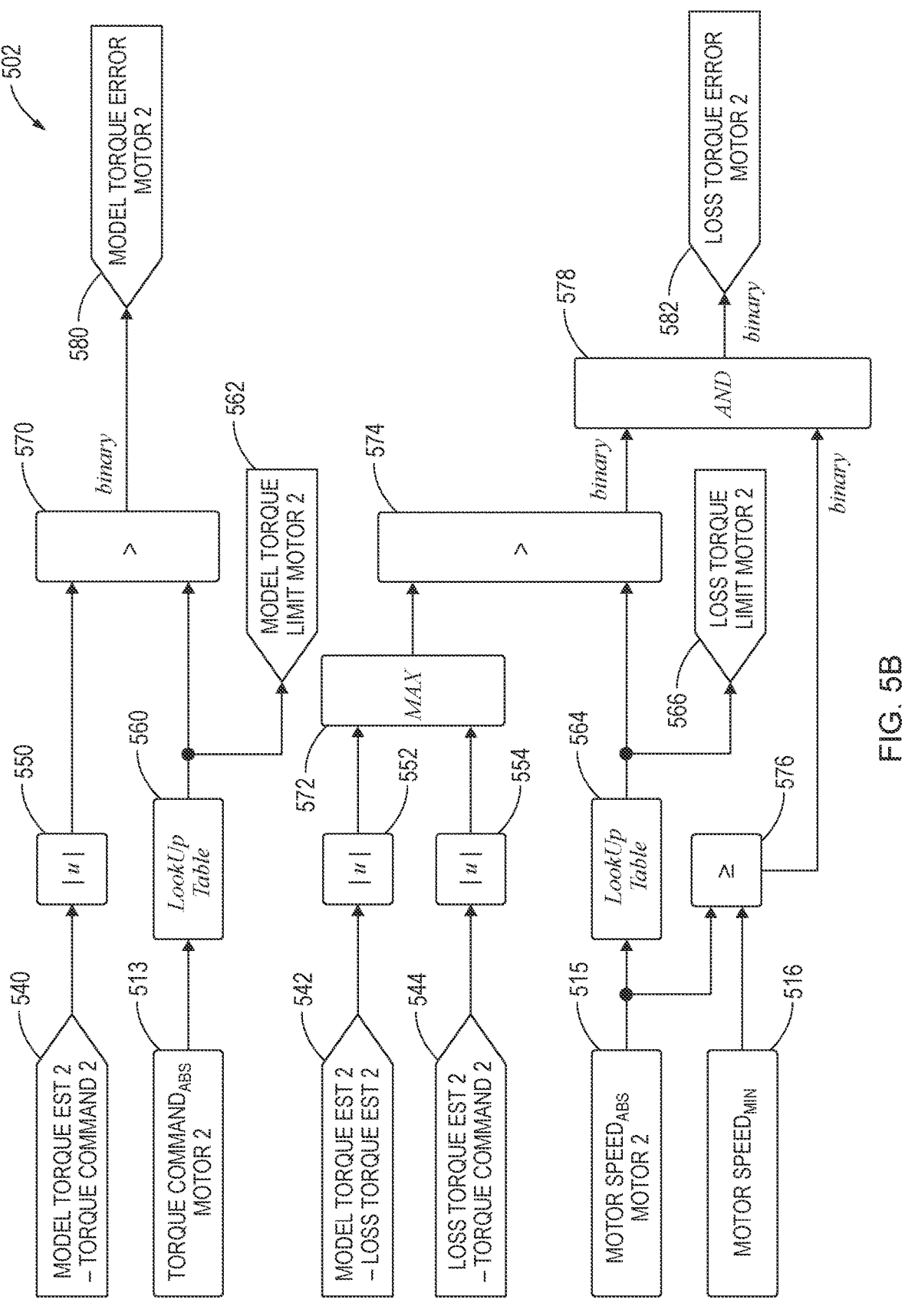

FIGS. 5A, 5B present block diagrams 500, 502 illustrating exemplary functionality for TM module 320 for motor 2, in accordance with embodiments of the present disclosure.

Generally, TM module 320 generates a model-based torque error for motor 2 and a loss-based torque error for motor 2 by comparing the model-based torque estimate for motor 2, the torque command for motor 2, and the loss-based torque estimate for motor 2.

More particularly, FIG. 5A presents a first portion of the functionality for TM module 320, while FIG. 5B presents a second portion of the functionality for TM module 320. The first portion of the functionality for TM module 320 generates several intermediate results for input to the second portion of the functionality for TM module 320.

As depicted in FIG. 5A, TM module 320 receives certain data from data 350, including, inter alia, model torque estimate 510 for motor 2, torque command 512 for motor 2, and loss torque estimate 514 for motor 2. TM module 320 processes these data, and outputs certain results to the second portion of the functionality for TM module 320, including model torque estimate error 540 for motor 2, model-loss torque estimate difference 542 for motor 2, and loss torque estimate error 544 for motor 2.

In certain embodiments, subtraction block 530 may receive model torque estimate 510 and torque command 512 from data 350, subtraction block 532 may receive model torque estimate 510 and loss torque estimate 514 from data 350, and subtraction block 534 may receive loss torque estimate 514 and torque command 512 from data 350.

Subtraction block 530 receives model torque estimate 510 and torque command 512, subtracts torque command 512 from model torque estimate 510, and outputs model torque estimate error 540 for motor 1. Subtraction block 532 receives model torque estimate 510 and loss torque estimate 514, subtracts loss torque estimate 514 from model torque estimate 510, and outputs model-loss torque estimate difference 542 for motor 1. Subtraction block 534 receives loss torque estimate 514 and torque command 512, subtracts torque command 512 from loss torque estimate 514, and outputs loss torque estimate error 544 for motor 1.

In other embodiments, respective digital filters may be applied to model torque estimate 510, torque command 512, and loss torque estimate 514 as new data 350 arrive over time. For example, digital filter 520 may receive model torque estimate 510 and output filtered model torque estimate 510.f, digital filter 522 may receive torque command 512 and output filtered torque command 512.f, and digital filter 524 may receive loss torque estimate 514 and output filtered loss torque estimate 514.f. Digital filters 520, 522, 524 may be $1^{st}$ order digital filters, $2^{nd}$ order digital filters, etc.

Subtraction block 530 receives filtered model torque estimate 510.f and filtered torque command 512.f, subtracts filtered torque command 512.f from filtered model torque estimate 510.f, and outputs model torque estimate error 540 for motor 1. Subtraction block 532 receives filtered model torque estimate 510.f and filtered loss torque estimate 514.f, subtracts filtered loss torque estimate 514.f from filtered model torque estimate 510.f, and outputs model-loss torque estimate difference 542 for motor 1. Subtraction block 534 receives filtered loss torque estimate 514.f and filtered torque command 512.f, subtracts filtered torque command 512.f from filtered loss torque estimate 514.f, and outputs loss torque estimate error 544 for motor 1.

As depicted in FIG. 5B, TM module 320 also receives torque command$_{ABS}$ 513 for motor 2, motor speed$_{ABS}$ 515 for motor 2, and motor speed$_{MIN}$ 516 for motor 2 from data 350. TM module 320 processes the data received from data 350 as well as model torque estimate error 540, model-loss torque estimate difference 542, loss torque estimate error 544 (described above), and outputs certain results to TM module 330, including model torque error 580 for motor 2, and loss torque error 582 for motor 2.

TM module 320 generates model torque error 580 based on model torque estimate error 540 (which is based on torque command 512 and model torque estimate 510), and model torque limit 562 for motor 2.

Advantageously, model torque limit 562 for motor 2 is equal to the axle torque limit, which is twice the torque limit of each motor in the conventional method discussed above. This expands motor torque integrity all the way to half of the speed of the conventional method, such as from 2,000 rpm (conventional method) to 1,000 rpm (certain embodiments of the present disclosure). Additionally, the use of the axle torque limit for motor 2 may significantly reduce the probability of false torque triggering for model-based torque limits.

More particularly, model torque estimate error 540 is input to absolute value block 550, which generates and provides the absolute value of model torque estimate error 540 to greater than (>) block 570. Torque command$_{ABS}$ 513 is input to lookup table function 560, which generates and provides model torque limit 562 to greater than block 570. Greater than block 570 compares the absolute value of model torque estimate error 540 to model torque limit 562, and generates model torque error 580 (a binary value). When the absolute value of model torque estimate error 540 is greater than model torque limit 562, model torque error 580 has a value of 1 (or TRUE), otherwise, model torque error 580 has a value of 0 (or FALSE).

TM module 320 generates loss torque error 582 based on loss torque estimate error 544 (which is based on torque command 512 and loss torque estimate 514), model-loss torque estimate difference 542 (which is based on model torque estimate 510 and loss torque estimate 514), and loss torque limit 566 for motor 2.

Advantageously, loss torque limit 566 for motor 2 is also equal to the axle torque limit, which is twice the torque limit of each motor in the conventional method discussed above. This expands motor torque integrity all the way to half of the speed of the conventional method, such as from 2,000 rpm (conventional method) to 1,000 rpm (certain embodiments of the present disclosure). Additionally, the use of the axle torque limit for motor 2 may significantly reduce the probability of false torque triggering for loss-based torque limits.

More particularly, model-loss torque estimate difference 542 is input to absolute value block 552, which generates and provides the absolute value of model-loss torque estimate difference 542 to MAX block 572. Loss torque estimate error 544 is also input to absolute value block 552, which generates and provides the absolute value of loss torque estimate error 544 to MAX block 572. MAX block 572 determines and provides the maximum of these two values to greater than (>) block 574.

Motor speed$_{ABS}$ 515 is input to lookup table function 564, which generates and provides loss torque limit 566 to greater than block 574. Motor speed$_{ABS}$ 515 is also input to greater than or equal to (≥) block 576, along with motor speed$_{MIN}$ 516. Greater than or equal to block 576 compares loss torque limit 566 to motor speed$_{MIN}$ 516, and generates a minimum motor speed binary value. When the motor speed$_{ABS}$ 515 is greater than or equal to motor speed$_{MIN}$ 516, the minimum motor speed binary value has a value of 1 (or TRUE), otherwise, the minimum motor speed binary value has a value of 0 (or FALSE). The minimum motor speed binary value is input to AND block 578.

Greater than block 574 compares the maximum value generated by MAX block 572 to loss torque limit 566, and generates an intermediate loss torque error binary value. When the maximum value generated by MAX block 572 is greater than loss torque limit 566, the intermediate loss torque error binary value has a value of 1 (or TRUE), otherwise, the intermediate loss torque error binary value has a value of 0 (or FALSE). The intermediate loss torque error binary value is input to AND block 578.

As discussed above, the accuracy of loss torque estimate 514 depends on motor speed$_{ABS}$ 515, and improves at higher motor speeds. Accordingly, loss-based torque is deactivated below certain motor speeds (i.e., motor speed$_{MIN}$ 516, such as 1,000 rpm). Generally, motor speed$_{MIN}$ 416 and motor speed$_{MIN}$ 516 may have the same value, such as 1,000 rpm.

The AND block 578 generates loss torque error 582 (a binary value). When both the minimum motor speed binary value and the intermediate loss torque error binary value are 1 (or TRUE), loss torque error 582 has a value of 1 (or TRUE). Otherwise, loss torque error 582 has a value of 0 (or FALSE).

Model torque error 580 and loss torque error 582 are provided to TM module 330.

In certain embodiments, model torque error 580 may be deactivated during a high voltage (HV) bus active discharge event to avoid interfering with other vehicle crash logic. In certain embodiments, data 350 may include an active short flag for motor 2 (a binary value), which may be set to 1 to signify an HV bus active discharge event, and set to 0 to signify the absence of an HV bus active discharge event. The active short flag for motor 2 may be input to a NOT block (logical compliment), and the output of the NOT block may be input to an AND block along with the output of the greater than block 570. Model torque error 580 is the result of the AND operation of the (negated) active short flag for motor 2 and the output of greater than block 570.

For example, when the active short flag for motor 2 has a value of 0 (signifying the absence of an HV bus active discharge event), the NOT block changes the binary value of the active short flag for motor 2 from 0 to 1, and the AND block performs a logical AND operation on 1 and the output of greater than block 570. The output of the AND block is simply the output of greater than block 570, which is provided as the value of model torque error 580.

Conversely, when the active short flag for motor 2 has a value of 1 (signifying an HV bus active discharge event), the NOT block changes the binary value of the active short flag for motor 2 from 1 to 0, and the AND block performs a logical AND operation on 0 and the output of greater than block 570. The output of the AND block is 0 regardless of the binary value of the output of greater than block 570, which is provided as the value of model torque error 580. A binary value of 0 effectively deactivates model torque error 580.

In certain embodiments, loss torque error 582 may be deactivated during a power down event to avoid interfering with other vehicle logic. In certain embodiments, data 350 may include a power down flag for motor 2 (a binary value), which may be set to 1 to signify a power down event, and set to 0 to signify the absence of a power down event. The power down flag for motor 2 may be input to a NOT block (logical compliment), and the output of the NOT block may be input to an AND block along with the output of the greater than block 574. Loss torque error 582 is the result of the AND operation of the (negated) power down flag for motor 1 and the output of greater than block 574.

Figure 6A:
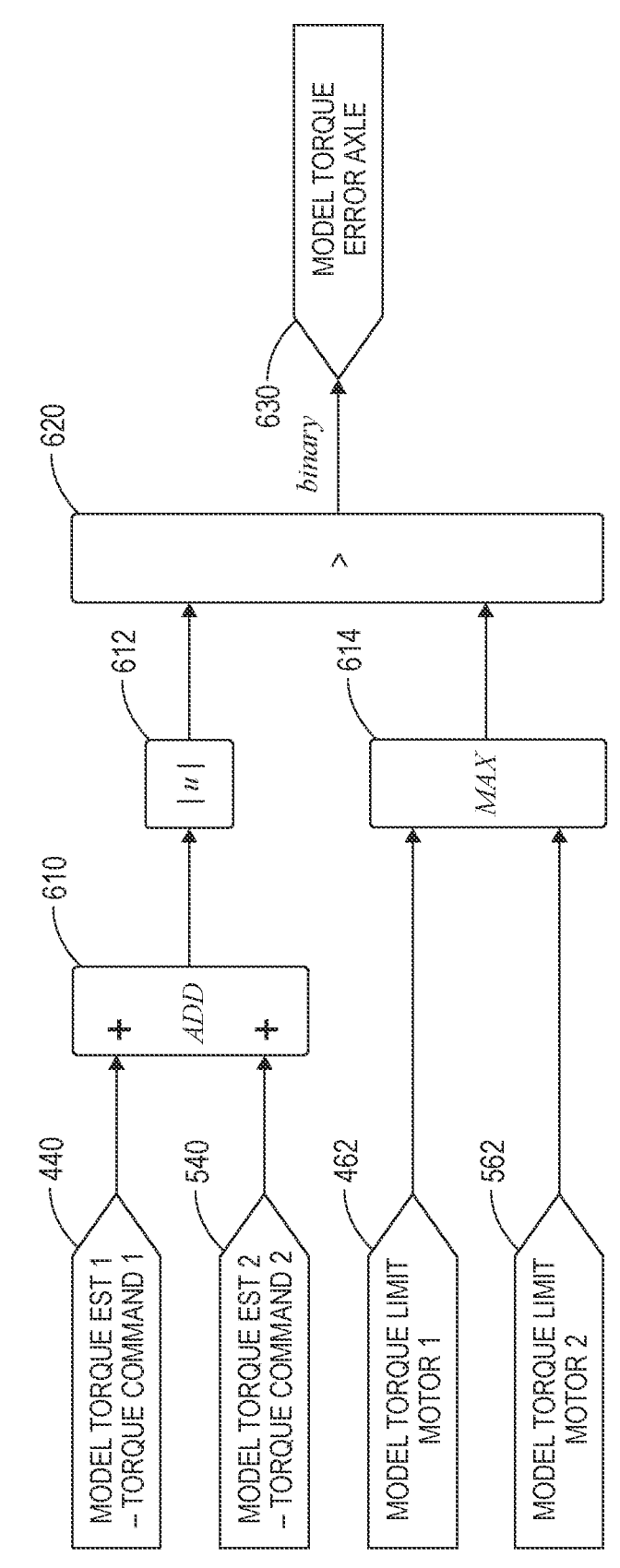
FIGS. 6A, 6B present block diagrams illustrating exemplary functionality for a TM module for motor 1 and motor 2, in accordance with embodiments of the present disclosure.
Figure 6B:
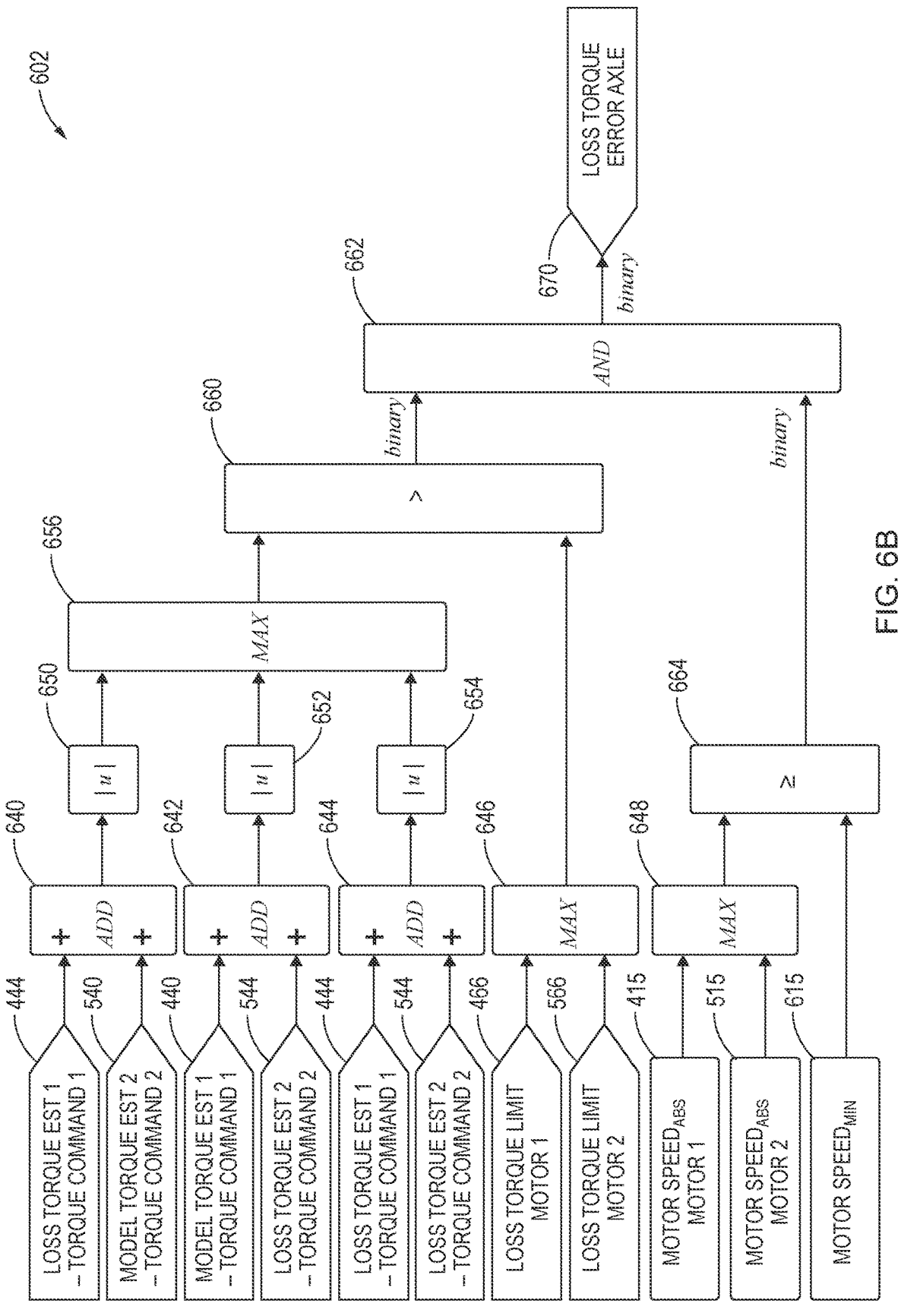

FIGS. 6A, 6B present block diagrams 600, 602, respectively, illustrating exemplary functionality for TM module 330, in accordance with embodiments of the present disclosure.

In a dual motor EDU 180 configuration, torque command 412 for motor 1 and torque command 512 for motor 2 may have different values. Advantageously, embodiments of the present disclosure decouple the difference in the torque commands from the torque monitoring process because the axle torque errors consider the cumulative error of each motor independently.

Generally, TM module 330 generates model torque error 630 for the axle (i.e., motor 1 and motor 2) and loss torque error 670 for the axle (i.e., motor 1 and motor 2) by comparing six signals, i.e., model torque estimate 410 for motor 1, torque command 412 for motor 1, loss torque estimate 414 for motor 1, model torque estimate 510 for motor 2, torque command 512 for motor 2, and loss torque estimate 514 for motor 2. Rather than a traditional permutation of (6/2)=15 comparisons for these six signals, 10 comparisons are performed instead, i.e., 3 comparisons for motor 1, 3 comparisons for motor 2, and 4 comparisons for the axle (i.e., for motor 1 and motor 2), which advantageously reduces the computation burden of supervisory processor 183.

More particularly, FIG. 6A presents a first portion of the functionality for TM module 330 that generates model torque error 630, while FIG. 6B presents a second portion of the functionality that generates loss torque error 670 for the axle.

As depicted in FIG. 6A, TM module 330 receives model torque estimate error 440 and model torque limit 462 from TM 310, and receives model torque estimate error 540 and model torque limit 562 from TM 320. TM module 330 processes these data, and outputs model torque error 630 to TM module 340.

In certain embodiments, addition block 610 may receive and add model torque estimate error 440 and model torque estimate error 540, and output the result to absolute value block 612, which generates and provides the absolute value of the result to greater than (>) block 620. MAX block 614 may receive model torque limit 462 and model torque limit 562, determine and then provide the maximum of these two values to greater than block 620. Greater than block 620 compares the absolute value generated by absolute value block 612 to the maximum value generated by MAX block 614, and generates model torque error 630 (a binary value).

In certain embodiments, model torque error 630 may be deactivated during a high voltage (HV) bus active discharge event to avoid interfering with other vehicle crash logic, in a manner similar to model torque error 480 and model torque error 580 discussed above. TM module 330 may receive the (negated) active short flag for motor 1 from TM module 310 and the (negated) active short flag for motor 2 from TM module 320. These (negated) active short flags may be input to a first AND block, and the output of the first AND block may be provided to a second AND block along with the output of greater than block 620. The output of the second AND block is then provided as the value of model torque error 630.

For example, when the (negated) active short flag for motor 1 and the (negated) active short flag for motor 2 both have a value of 1 (signifying the absence of an HV bus active discharge event), the output of the second AND block is simply the output of greater than block 620, which is provided as the value of model torque error 630. When either the (negated) active short flag for motor 1 or the (negated) active short flag for motor 2 have a value of 0 (signifying the presence of an HV bus active discharge event), the output of the second AND block is 0 regardless of the binary value of the output of greater than block 620, which is provided as the value of model torque error 630. A binary value of 0 effectively deactivates model torque error 630.

As depicted in FIG. 6B, TM module 330 receives model torque estimate error 440, loss torque estimate error 444, and loss torque limit 466 from TM 310, receives model torque estimate error 540, loss torque estimate error 544, and loss torque limit 566 from TM 320, and receives motor speed$_{ABS}$ 415, motor speed$_{ABS}$ 515, and motor speed$_{ABS}$ 615 from data 350. Generally, motor speed$_{MIN}$ 416, motor speed$_{MIN}$ 516, and motor speed$_{MIN}$ 616 may have the same value, such as 1,000 rpm.

In certain embodiments, addition block 640 may receive and add loss torque estimate error 444 and model torque estimate error 540, and output the result to absolute value block 650, which generates and provides the absolute value of the result to MAX block 656. Similarly, addition block 642 may receive and add model torque estimate error 440 and loss torque estimate error 544, and output the result to absolute value block 652, which generates and provides the absolute value of the result to MAX block 656. Similarly, addition block 644 may receive and add loss torque estimate error 444 and loss torque estimate error 544, and output the result to absolute value block 654, which generates and provides the absolute value of the result to MAX block 656.

MAX block 656 may receive these three results, determine and then provide the maximum of these three values to greater than (>) block 660. MAX block 646 may receive loss torque limit 466 and loss torque limit 566, determine and then provide the maximum of these two values to greater than block 660. MAX block 648 may receive motor speed$_{ABS}$ 415 from TM module 310, receive motor speed$_{ABS}$ 515 from TM module 320, determine and then provide the maximum of these two values to greater than (>) block 664.

Greater than block 660 compares the maximum value generated by MAX block 656 to the maximum value generated by MAX block 646, and generates and provides an intermediate loss torque error binary value to AND block 662. Greater than block 664 compares the maximum value generated by MAX block 648 to motor speed$_{MIN}$ 616, and generates and provides a minimum motor speed binary value to AND block 662.

AND block 662 generates loss torque error 670 for the axle (a binary value). When both the intermediate loss torque error binary value and the minimum motor speed binary value are 1 (or TRUE), loss torque error 670 has a value of 1 (or TRUE). Otherwise, loss torque error 670 has a value of 0 (or FALSE). As discussed above, the accuracy of loss torque error 670 depends on motor speed$_{ABS}$ 415, 515, and improves at higher motor speeds. Accordingly, loss-based torque is deactivated below certain motor speeds (i.e., motor speed$_{MIN}$ 616, such as 1,000 rpm).

In certain embodiments, loss torque error 670 may be deactivated during a power down event to avoid interfering with other vehicle logic, in a manner similar to loss torque error 482 and loss torque error 582, discussed above. TM module 330 may receive the (negated) power down flag for motor 1 from TM module 310 and the (negated) power down flag for motor 2 from TM module 320. These (negated) power down flags may be input to a first AND block, and the output of the first AND block may be provided to AND block 662.

For example, when the (negated) power down flag for motor 1 and the (negated) power down flag for motor 2 both have a value of 1 (signifying the absence of a power down event), the output of AND block 662 is based on the intermediate loss torque error binary value and the minimum motor speed binary value, which is provided as the value of loss torque error 670. When either the (negated) power down flag for motor 1 or the (negated) power down flag for motor 2 has a value of 0 (signifying the presence of a power down event), the output of AND block 662 is 0 regardless of the intermediate loss torque error binary value and the minimum motor speed binary value, which is provided as the value of loss torque error 670. A binary value of 0 effectively deactivates loss torque error 670.

Figure 7:
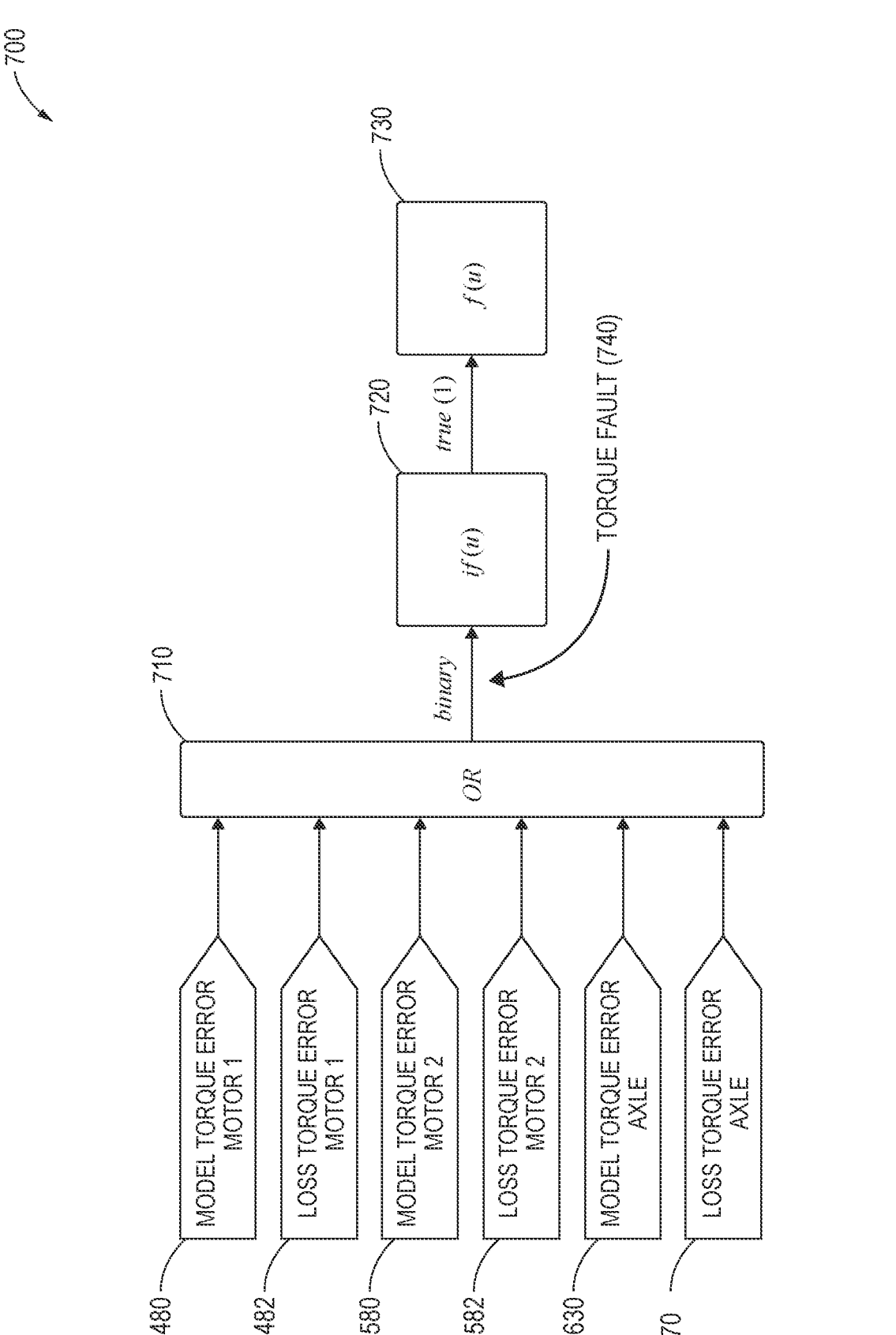
FIG. 7 presents a block diagram illustrating exemplary functionality for a TM module for fault triggering, in accordance with embodiments of the present disclosure.

FIG. 7 presents block diagram 700 illustrating exemplary functionality for TM module 340 for fault triggering, in accordance with embodiments of the present disclosure.

A torque monitoring fault may occur if any of the torque comparisons discussed above is triggered by a model torque error or a loss torque error having a binary value of 1.

As depicted in FIG. 7, TM module 340 receives model torque error 480 and loss torque error 482 from TM 310, receives model torque error 580 and loss torque error 582 from TM 320, and receives model torque error 630 and loss torque error 670 from TM module 330. TM module 340 processes these data, and generates torque fault 740, which may cause a predetermined function to be executed by supervisory processor 183.

In certain embodiments, OR block 710 may receive and compare model torque error 480, loss torque error 482, model torque error 580, loss torque error 582, model torque error 630, and loss torque error 670 tom one another, and output torque fault 740 (a binary value). Conditional block 720 tests the value of torque fault 740, and if the value is 1 (or TRUE), one or more predetermined functions 730 are executed. Predetermined function 730 may include transmitting a torque fault notification message from supervisory processor 183 to a vehicle control system processor, such as XCC ECU 270, or other functionality.

Advantageously, supervisory processor 183 has visibility over both processors 184 as well as the torque produced by both motors 187, and may instruct the either processor 184 to change its operation accordingly for recovery and other purposes.

Figure 8:
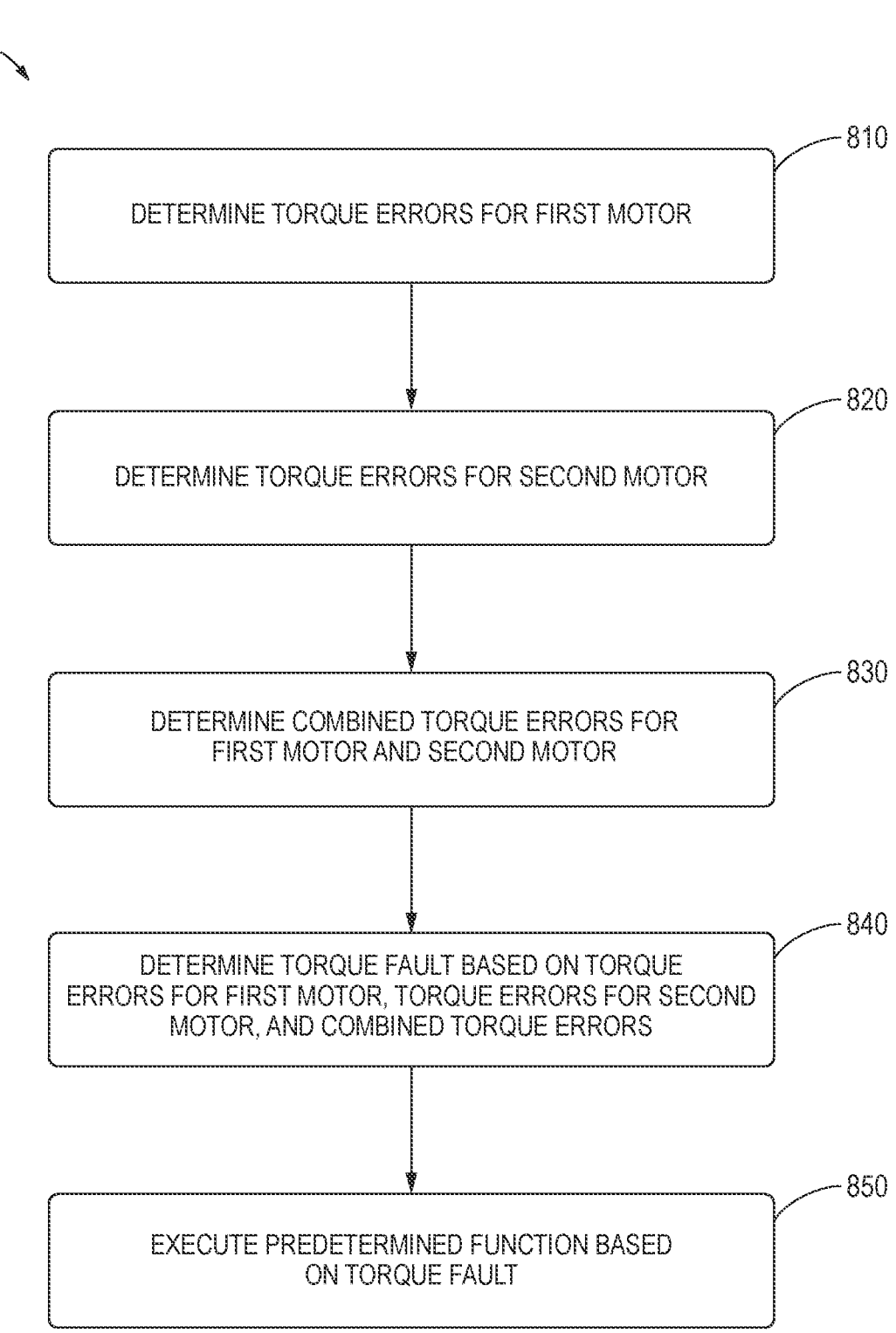
FIG. 8 depicts flow chart illustrating functionality associated with dual motor torque monitoring, in accordance with embodiments of the present disclosure.

FIG. 8 depicts flow chart 800 illustrating functionality associated with dual motor torque monitoring, in accordance with embodiments of the present disclosure.

At 810, torque errors (M1_comp1, M1_comp2) for a first motor are determined. In certain embodiments, the torque errors for the first motor include motor torque error 480 and loss torque error 482, as discussed above with respect to FIGS. 4A, 4B.

At 820, torque errors (M2_comp1, M2_comp2) for a second motor are determined. In certain embodiments, the torque errors for the second motor include motor torque error 580 and loss torque error 582, as discussed above with respect to FIGS. 5A, 5B.

At 830, combined torque errors (Axle_comp1, Axle_comp2) for the first motor and the second motor are determined. In certain embodiments, the combined torque error for the first motor includes model torque error 630 and loss torque error 670, as discussed above with respect to FIGS. 6A, 6B.

At 840, torque fault 740 (TrqMonitorFail) is determined based on the torque errors for the first motor, the torque errors for the second motor, and the combined torque errors. In certain embodiments, torque fault 740 is determined based on motor torque error 480, loss torque error 482, motor torque error 580, loss torque error 582, model torque error 630, and loss torque error 670, as discussed above with respect to FIGS. 4A, 4B, 5A, 5B, 6A, 6B.

At 850, a predetermined function is executed based on torque fault 740 (TrqMonitorFail). In certain embodiments, the predetermined function includes transmitting a torque fault notification message from a motor control unit supervisory processor, such as supervisory processor 183, to a vehicle control system processor, such as XCC EDU 270.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A method for dual motor torque monitoring by a motor controller unit, the method comprising:

determining, by a first processor, a first motor speed and storing the first motor speed in a memory;

determining, by a second processor, a second motor speed and storing the second motor speed in the memory;

receiving, by a supervisory processor, a first torque command for the first motor from a vehicle control system processor over a communication link;

receiving, by the supervisory processor, a second torque command for the second motor from the vehicle control system processor over the communication link;

determining, by the supervisory processor, torque errors for a first motor based at least in part on the first motor speed stored in the memory and the first torque command;

determining, by the supervisory processor, torque errors for a second motor based at least in part on the second motor speed stored in the memory and the second torque command;

determining, by the supervisory processor, combined torque errors for the first motor and the second motor;

determining, by the supervisory processor, a torque fault based on the torque errors for the first motor, the torque errors for the second motor, and the combined torque errors; and transmitting, by the supervisory processor, a torque fault notification message to the vehicle control system processor over the communication link, the torque fault notification message including the torque fault.

2. The method of claim 1, wherein:

the torque errors for the first motor include a first model torque error and a first loss torque error; and the torque errors for the second motor include a second model torque error and a second loss torque error.

3. The method of claim 2, wherein:

the first model torque error is determined based on a first current model for the first motor;

the first loss torque error is determined based on a first voltage model for the first motor;

the second model torque error is determined based on a second current model for the second motor; and the second loss torque error is determined based on a second voltage model for the second motor.

4. The method of claim 2, wherein:

the first model torque error is determined based on the first torque command, a first model torque estimate, and a first model torque limit; and the first loss torque error is determined based on the first torque command, the first model torque estimate, a first loss torque estimate, and a first loss torque limit.

5. The method of claim 4, wherein:

the second model torque error is determined based on the second torque command, a second model torque estimate, and a second model torque limit; and the second loss torque error is determined based on the second torque command, the second model torque estimate, a second loss torque estimate, and a second loss torque limit.

6. The method of claim 1, wherein the combined torque errors for the first motor and the second motor include a combined model torque error and a combined loss torque error.

7. The method of claim 6, wherein:

the combined model torque error is determined based on the first torque command, a first model torque estimate, the second torque command, and a second model torque estimate; and the combined loss torque error is determined based on the first torque command, the first model torque estimate, a first loss torque estimate, the second torque command, the second model torque estimate, and a second loss torque estimate.

8. The method of claim 7, wherein:

the combined model torque error is further determined based on a first model torque limit and a second model torque limit; and the combined loss torque error is further determined based on a first loss torque limit, a second loss torque limit, a first motor speed, a second motor speed, and a motor speed limit.

9. A motor controller unit (MCU), comprising:

a first processor, coupled to a first motor and a memory, the first processor configured to determine a first motor speed and store the first motor speed in the memory, wherein the memory comprises one or more memories;

a second processor, coupled to a second motor and the memory, the second processor configured to determine a second motor speed and store the second motor speed in the memory; and a supervisory processor, coupled to the first processor, the second processor, and the memory, the supervisory processor configured to:

receive, from a vehicle control system processor over a communication link, a first torque command for the first motor;

receive, from the vehicle control system processor over the communication link, a second torque command for the second motor;

determine torque errors for the first motor based at least in part on the first motor speed stored in the memory and the first torque command, determine torque errors for the second motor based at least in part on the second motor speed stored in the memory and the second torque command, determine combined torque errors for the first motor and the second motor, determine a torque fault based on the torque errors for the first motor, the torque errors for the second motor, and the combined torque errors, and transmit a torque fault notification message to the vehicle control system processor over the communication link, the torque fault notification message including the torque fault.

10. The MCU of claim 9, wherein:

the torque errors for the first motor include a first model torque error and a first loss torque error;

the first model torque error is determined based on the first torque command, a first model torque estimate, and a first model torque limit; and the first loss torque error is determined based on the first torque command, the first model torque estimate, a first loss torque estimate, and a first loss torque limit.

11. The MCU of claim 10, wherein:

the first model torque error is determined based on a current model for the first motor;

the first loss torque error is determined based on a voltage model for the first motor.

12. The MCU of claim 10, wherein:

the torque errors for the second motor include a second model torque error and a second loss torque error;

the second model torque error is determined based on the second torque command, a second model torque estimate, and a second model torque limit; and the second loss torque error is determined based on the second torque command, the second model torque estimate, a second loss torque estimate, and a second loss torque limit.

13. The MCU of claim 12, wherein:

the second model torque error is determined based on a current model for the second motor; and the second loss torque error is determined based on a voltage model for the second motor.

14. The MCU of claim 12, wherein:

the combined torque errors for the first motor and the second motor include a combined model torque error and a combined loss torque error;

the combined model torque error is determined based on the first torque command, the first model torque estimate, the first model torque limit, the second torque command, the second model torque estimate, and the second model torque limit; and the combined loss torque error is determined based on the first torque command, the first model torque estimate, the first loss torque estimate, the first loss torque limit, the second torque command, the second model torque estimate, the second loss torque estimate, the first motor speed, and the second motor speed.

15. A method for dual motor torque monitoring by a motor controller unit, the method comprising:

determining, by a first processor, a first motor speed and storing the first motor speed in a memory;

determining, by a second processor, a second motor speed and storing the second motor speed in the memory;

receiving, by a supervisory processor, a first torque command for the first motor from a vehicle control system processor over a communication link;

receiving, by the supervisory processor, a second torque command for the second motor from the vehicle control system processor over the communication link;

determining, for a first motor, a first model torque error, and a first loss torque error;

determining, for a second motor, a second model torque error, and a second loss torque error;

determining a combined model torque error, and a combined loss torque error;

determining a torque fault based on the first model torque error, the first loss torque error, the second model torque error, the second loss torque error, the combined model torque error, and the combined loss torque error; and transmitting a torque fault notification message from the supervisory processor to the vehicle control system processor over the communication link, the torque fault notification message including the torque fault.

16. The method of claim 15, wherein:

the first model torque error is determined based on the first torque command, a first model torque estimate, and a first model torque limit; and the first loss torque error is determined based on the first torque command, the first model torque estimate, a first loss torque estimate, and a first loss torque limit.

17. The method of claim 16, wherein:

the second model torque error is determined based on the second torque command, a second model torque estimate, and a second model torque limit; and the second loss torque error is determined based on the second torque command, the second model torque estimate, a second loss torque estimate, and a second loss torque limit.

18. The method of claim 17, wherein:

the first model torque error is determined based on a first current model for the first motor;

the first loss torque error is determined based on a first voltage model for the first motor;

the second model torque error is determined based on a second current model for the second motor; and the second loss torque error is determined based on a second voltage model for the second motor.

19. The method of claim 17, wherein:

the combined model torque error is determined based on the first torque command, the first model torque estimate, the first model torque limit, the second torque command, the second model torque estimate, and the second model torque limit; and the combined loss torque error is determined based on the first torque command, the first model torque estimate, the first loss torque estimate, the first loss torque limit, the second torque command, the second model torque estimate, the second loss torque estimate, a first motor speed, and a second motor speed.

*    *    *    *    *